Patented Feb. 13, 1923.

1,445,082

UNITED STATES PATENT OFFICE.

BERNARD HOWARD JACOBSON, OF CHARLESTON, WEST VIRGINIA, ASSIGNOR TO E. C. KLIPSTEIN & SONS COMPANY, OF NEW YORK, N. Y., A CORPORATION OF NEW JERSEY.

METHOD OF MANUFACTURING ANHYDROUS METALLIC CHLORIDES.

No Drawing.        Application filed June 10, 1921.    Serial No. 476,633.

*To all whom it may concern:*

Be it known that I, BERNARD HOWARD JACOBSON, a citizen of the United States, residing at 422 Shrewsbury Street, Charleston, in the county of Kanawha, in the State of West Virginia, have discovered a New Method of Manufacturing Anhydrous Metallic Chlorides, of which the following is a specification.

This invention relates to the process of making chloride from a metal by the action thereon of bromine and chlorine; and with rapidity, at relatively low temperatures, without loss of the starting materials and with the recovery of the bromine undiminished for use over and over again in the process; and has for its object, to render the process far more simple, expeditious and cheap.

I will describe my improved process by way of illustration and not as a limitation as a specific method of manufacturing anhydrous aluminium chloride from the metal aluminium and chlorine and at a relatively low temperature, say ordinarily 150 degrees C. at the highest, whereas by the prior art the temperatures generally go at 1000 degrees C. starting at 300° C.

In this special illustration of my process I take the metal aluminium, preferably in small pieces, and treat it with liquid bromine in a closed vessel provided with a reflux condenser, and I do this by pouring the bromine upon the aluminium metal. The bromine and the aluminium even at room temperature liberate by their reaction, a large quantity of heat, which can be removed by external cooling. There is thus formed in a short time, a few minutes, anhydrous aluminium bromide, $AlBr_3$, a solid at room temperature, melting at 93° C. and boiling at 263° C., an intermediate product in this specific illustration.

Through the molten liquid aluminium bromide thus formed, I pass a stream of chlorine gas, bubbling it up through the liquid and introduced by a pipe carrying the chlorine from its source of supply down through the liquid, the aluminium bromide, to near the bottom of the vessel containing this liquid, and thereupon this bubbling chlorine gas reacts instantly with the aluminium bromide $AlBr_3$, forming the anhydrous aluminium chloride desired, $AlCl_3$, and liberating bromine as a gas which when passed through a condenser is recovered as liquid bromine which may be used over and over, and this without loss of the bromine.

The chemical equations are as follows:—

(1) $Al—3Br=AlBr_3$
(2) 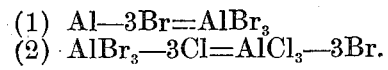

We thus have the metallic aluminium dissolving in the liquid bromine and forming aluminium bromide which on the introduction of the chlorine immediately gives up the bromine and unites with the chlorine forming aluminium chloride, the desired product, and a solid, the bromine being released substantially undiminished to be used over again.

I may do substantially the like as a continuous process by taking the same vessel with its reflux condenser attached, filling the same with aluminium in small pieces, adding a small quantity of bromine, thus forming a little aluminium bromide $AlBr_3$ as before. Through this small quantity of aluminium bromide just formed I pass chlorine in the presence of aluminium liberating therefrom its bromine which combines at once with the aluminium present forming more aluminium bromide and so on until all the aluminium is used up, in a continuous process. This step in the process is best carried out under heat and pressure, say 190° C. and 40 lbs. pressure to the square inch. In the aluminium chloride there would be a little bromide, $AlBr_3$ which could be converted into aluminium chloride by passing chlorine through it in the absence of aluminium leaving pure aluminium chloride.

A less satisfactory method but yet with some advantages, is to bring aluminium, bromine and chlorine together in a closed vessel under heat and pressure about as hereinbefore specified to which aluminium and bromine may be supplied either continuously or in intermittent quantity without releasing the pressure within the condenser and to which chlorine is added, preferably continuously toward the bottom of the liquid. The bromine as before comes off in a gas and is condensed, and the process may be continued until the vessel is full of the aluminium chloride produced.

Similarly, I may make iron chloride, zinc chloride, tin chloride, antimony chloride and arsenic chloride and other metallic chlorides, all anhydrous, except sodium chloride; for sodium will not react with bromine under ordinary conditions or by my process.

I have thus described my new method of manufacture as an example, but I do not confine myself to proportions or to apparatus or to temperatures or pressures specified and may employ chemical equivalents and open or closed vessels not employing pressure.

What I claim and desire to secure by Letters Patent is:

1. The process of manufacturing anhydrous metallic chlorids which comprises reacting upon a metal with bromine and free chlorine to convert the metal into chlorid.

2. The process of manufacturing metallic chlorids which comprises reacting upon a metal with less than the chemically equivalent quantity of bromine and with sufficient free chlorine to effect conversion of the metal ultimately into chlorid.

3. The process of manufacturing metallic chlorids which comprises subjecting a metal under reacting conditions to the action of free chlorine with the aid of bromine as a carrier.

4. The process of manufacturing metallic chlorids which comprises reacting upon a metal with bromine and free chlorine to convert the metal into chlorid, the bromine being used over and over in the process.

5. The process of manufacturing anhydrous aluminum chlorid which comprises reacting upon metallic aluminum with bromine and free chlorine to convert the metal into the chlorid.

6. The process of manufacturing anhydrous aluminum chlorid which comprises reacting upon metallic aluminum with bromine and free chlorine to convert the metal into the chlorid, and recovering the bromine for re-use.

7. The process of manufacturing anhydrous aluminum chlorid which comprises reacting upon aluminum with chlorine with the aid of bromine as a carrier.

8. The process of manufacturing anhydrous aluminum chlorid which comprises reacting upon aluminum with less than the chemically equivalent quantity of bromine and with chlorine in sufficient quantity to effect conversion into chlorid.

9. The process of manufacturing anhydrous aluminum chlorid which comprises reacting upon metallic aluminum with chlorine in the presence of available bromine.

10. The process of manufacturing anhydrous aluminum chlorid which comprises reacting upon metallic aluminum with a chloridizing agent in the presence of a relatively small amount of a bromidizing agent.

11. The process of manufacturing anhydrous aluminum chlorid which comprises reacting upon molten aluminum bromid with free chlorine.

12. The process of manufacturing anhydrous aluminum chlorid which comprises reacting with free chlorine upon a fluid mass comprising both aluminum bromid and metallic aluminum.

13. The process of manufacturing anhydrous aluminum chlorid which comprises treating a quantity of metallic aluminum with bromine in quantity less than sufficient to combine with all the aluminum, and then subjecting the resultant mass to the action of chlorine to form the chlorid.

14. The process of manufacturing anhydrous aluminum chlorid which comprises reacting upon metallic aluminum with liquid bromine, and subjecting the resultant mass in fluid condition to the action of chlorine gas to form the chlorid.

15. The process of manufacturing anhydrous aluminum chlorid which comprises partially converting a quantity of aluminum into bromid and treating the resultant mass with chlornie in reactive form to produce the chlorid.

16. The process of manufacturing anhydrous aluminum chlorid which comprises partially converting a quantity of aluminum into bromid and treating the resultant mass with chlorine in reactive form to produce the chlorid, precautions being taken to minimize loss of bromine during the operation.

17. The process of manufacturing anhydrous aluminum chlorid which comprises providing a mixture comprising aluminum bromid in fluid condition and comminuted metallic aluminum in a reaction vessel having a reflux condenser, and passing chlorine gas into said mixture.

18. The process of manufacturing anhydrous aluminum chlorid which comprises passing chlorine gas into aluminum bromid in fluid condition in the presence of metallic aluminum.

19. The process of manufacturing anhydrous aluminum chlorid which comprises bringing metallic aluminum, available bromine and chlorine together under reacting conditions in a suitable reaction vessel, introducing more chlorine into said vessel substantially continuously, adding more aluminum as the reaction proceeds, and maintaining the supply of available bromine in said vessel in amount sufficient to ensure the continued formation of aluminum chlorid.

In testimony whereof, I have hereunto set my hand and affixed my seal, at Charleston, West Virginia, this second day of June, 1921.

BERNARD HOWARD JACOBSON. [L. S.]

In presence of:—
GERALD P. KLIPSTEIN,
FELIX ERBSLOH.